(12) United States Patent
Cho et al.

(10) Patent No.: US 9,429,420 B2
(45) Date of Patent: Aug. 30, 2016

(54) DISTANCE MEASUREMENT APPARATUS

(75) Inventors: Sungjin Cho, Seoul (KR); Gyeongeon Lee, Seoul (KR); Hyunjoon Kim, Seoul (KR); Sunghoon Cha, Seoul (KR); Jeonguk Lee, Seoul (KR); Hyunseok Shin, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/362,387

(22) PCT Filed: Dec. 22, 2011

(86) PCT No.: PCT/KR2011/009996
§ 371 (c)(1),
(2), (4) Date: Jun. 2, 2014

(87) PCT Pub. No.: WO2013/094791
PCT Pub. Date: Jun. 27, 2013

(65) Prior Publication Data
US 2014/0347677 A1 Nov. 27, 2014

(51) Int. Cl.
*G01B 11/14* (2006.01)
*G01S 17/08* (2006.01)
*G01S 7/481* (2006.01)
(Continued)

(52) U.S. Cl.
CPC .............. *G01B 11/14* (2013.01); *G01B 11/02* (2013.01); *G01S 7/4811* (2013.01); *G01S 7/4817* (2013.01); *G01S 17/08* (2013.01); *G01S 17/42* (2013.01)

(58) Field of Classification Search
CPC .............. G01N 21/95684; G01N 2021/95661
USPC ............... 356/3.09, 624, 3.07, 3.01, 3.1, 356/3.11–3.14
See application file for complete search history.

(56) References Cited

U.S. PATENT DOCUMENTS

| 5,455,669 A | 10/1995 | Wetteborn | |
| 7,800,745 B2* | 9/2010 | Pan | G01J 1/02 356/121 |
| 2001/0023766 A1* | 9/2001 | Ohtomo | E02F 3/842 172/4.5 |

(Continued)

FOREIGN PATENT DOCUMENTS

| JP | 4059911 | 3/2008 |
| KR | 10-2007-0009591 | 1/2007 |

(Continued)

OTHER PUBLICATIONS

PCT International Application No. PCT/KR2011/009996, International Search Report dated Sep. 14, 2012, 3 pages.

(Continued)

*Primary Examiner* — Kara E Geisel
*Assistant Examiner* — Iyabo S Alli
(74) *Attorney, Agent, or Firm* — Lee, Hong, Degerman, Kang & Waimey; Jonathan Kang; Harry Lee (57) ABSTRACT

The present invention relates to a distance measurement apparatus. The distance measurement apparatus according to the present invention has, mounted thereon, a light transmitting portion which emits light, and a light receiving portion including a light receiving element where a spot of the light is collimated. The present invention comprises: a tilting base; and a rotating reflector which reflects the light emitted by the light transmitting portion to an object, and reflects the light reflected or scattered by the object to the light receiving portion.

16 Claims, 11 Drawing Sheets

(51) Int. Cl.
*G01B 11/02* (2006.01)
*G01S 17/42* (2006.01)

(56) References Cited

U.S. PATENT DOCUMENTS

2002/0089722 A1* 7/2002 Perkins ............... G01S 1/70
398/140
2011/0310360 A1* 12/2011 Hsieh ................ G03B 21/145
353/70

FOREIGN PATENT DOCUMENTS

| KR | 10-0682960 | 2/2007 |
|---|---|---|
| KR | 10-2010-0107164 | 10/2010 |
| KR | 10-2011-0032956 | 3/2011 |

OTHER PUBLICATIONS

Paulo Dias, "Camera Calibration and Texture mapping," IEETA/Universidade de Aveiro, XP055196721, Jul. 2004, 5 pages.
European Patent Office Application Serial No. 11878113.7, Search Report dated Jun. 29, 2015, 7 pages.

* cited by examiner

DISTANCE MEASUREMENT APPARATUS

CROSS-REFERENCE TO RELATED APPLICATIONS

This application is the National Stage filing under 35 U.S.C. 371 of International Application No. PCT/KR2011/009996, filed on Dec. 22, 2011, the contents of which are all hereby incorporated by reference herein in its entirety.

TECHNICAL FIELD

The present invention relates to an apparatus for measuring a distance.

BACKGROUND INVENTION

Generally, a distance may be obtained using a triangulation method. That is, a distance may be measured if a length of a side and a length of a side are known.

Based on this principle, a distance to an object may be obtained using a position of a light irradiated on an object, reflected from the object, dispersed from the object and formed on a light receiver and an angle of the emitted light. At this time, a position formed on a spot of the light receiver is changed when the distance to the object is changed, and a signal therefrom is detected to calculate a distance.

In general, a distance measuring apparatus that measures a distance to an object using light, such as laser light, performs the measurement using the TOF (Time-Of-Flight) technique and a PSD (Position Sensitive Device) utilizing the difference in angle of light that is reflected off a local object and a remote object.

The time-of-flight (TOF) method is used to measure a distance by detecting the difference between the time at which a light source emits reference light and a time at which an optical sensor detects the reflected light of the reference light, rebounded from a measured object.

As discussed above, many devices and methods measuring a distance to an object using a light are available, and multi-angled technical developments are being waged to better the devices and methods for measuring a distance to an object.

DETAILED DESCRIPTION OF THE INVENTION

Technical Problem

It is an object of the present invention to simplify optical elements and to scan a 3D space by measuring a distance to an object using a single reflector by slantly arranging the reflector or tilting a base mounted with a light transmitter and a light receiver.

Technical Subject

In one general object of the present invention is to provide an apparatus for measuring a distance, the apparatus comprising:

a tilting base mounted with a light transmitter configured to transmit a light and a light receiver including a photo-detector formed with a spot of the light (optical spot); and a rotating reflector configured to reflect the light emitted from the light transmitter to an object and to reflect the light reflected or dispersed from the object to the light receiver.

Preferably, but not necessarily, the apparatus may further comprise a tilt driver configured to tilt the base, wherein the tilt driver includes a motor, a first gear mounted on a rotation shaft of the motor, and a second gear meshed with the first gear and formed on the base.

Preferably, but not necessarily, the base may bed tilted to an optical axis emitted from the light transmitter and perpendicular to the rotation shaft of the reflector.

Preferably, but not necessarily, the reflector may be a mirror.

Preferably, but not necessarily, the reflector may include a light reflecting surface configured to reflect the light emitted from the light transmitter to the object, and to reflect the light reflected or dispersed from the object to the light receiver, wherein the light reflecting surface is slanted to the rotation shaft.

Preferably, but not necessarily, the reflector may be a double-sided mirror formed on two sides of the light reflecting surface, or a poly-prism mirror formed on a poly surface of the light reflecting surface.

Preferably, but not necessarily, the light transmitter may include a light source and a collimate lens configured to make the light emitted from the light source to a parallel light.

Preferably, but not necessarily, the light source may be an LD (Laser Diode) or an LED (Light Emitting Diode).

Preferably, but not necessarily, the light receiver may include a light receiving lens configured to concentrate the light dispersed or reflected from the object, and a photo-detector configured to detect a position of the object using the light.

Preferably, but not necessarily, a wavelength selective transmission filter may be interposed between the light receiving lens and the photo-detector for preventing an outside light other than the light emitted from the light source from entering the photo-detector.

Preferably, but not necessarily, the photo-detector may be an image sensor including a plurality of unit pixels arranged in 'n×m' matrix to convert an optical signal by the light to an electric signal.

Preferably, but not necessarily, the spot may be formed on unit pixels of a plurality of lines of the image sensor.

Preferably, but not necessarily, the apparatus may further comprise an MCU (Micro Control Unit) configured to process a signal relative to an object distance measured by the photo-detector to output a signal configured to determine whether there is an object distance data or an object.

Preferably, but not necessarily, the MCU may be embedded in a case of the light receiver.

Preferably, but not necessarily, the apparatus may scan an object of up to ±85° based on an axis perpendicular to an axis of light emitted from the light transmitter.

In another general aspect of the present invention, there is provided an apparatus for measuring a distance, the apparatus comprising:

a base mounted with a light receiver including a photo-detector formed with a spot of a light from a light transmitter configured to emit a light; and a rotating reflector configured to reflect the light emitted from the light transmitter to a light reflecting surface, to reflect the light reflected or dispersed from an object to the light receiver, and to allow the light reflecting surface to be slanted to a rotation shaft.

Advantageous Effects

The present invention can advantageously scan a 3D space using a triangulation method to detect whether there is an ambient object and to measure a distance to an object.

Furthermore, the present invention can tilt a base mounted with a light transmitter and a light receive, or arrange a reflector in a slant manner whereby a distance to an object can be measured by a single reflector, and optical elements can be simplified.

Still furthermore, the present invention has an advantageous effect in that a light transmitter can scan an object from both sides to detect the presence of the object and to expand a detection scope for measurement of a distance to the object, whereby more accurate scan is enabled.

BEST MODES

Now, the present invention will be described in detail with reference to the accompanying drawings.

In describing the present invention, dimensions such as sizes or thicknesses may be exaggerated, omitted, or schematically shown for clarity of illustration. Accordingly, the meaning of specific terms or words used in the specification and claims should not be limited to the literal or commonly employed sense, but should be construed or may be different in accordance with the intention of a user or an operator and customary usages. Therefore, the definition of the specific terms or words should be based on the contents across the specification.

The present invention can simplify mechanical elements of an apparatus for measuring a distance by tilting a base mounted with a light transmitter and a light receiver and receiving, by the light receiver, a light reflected or dispersed from an object by rotating a reflector.

Figure 1:
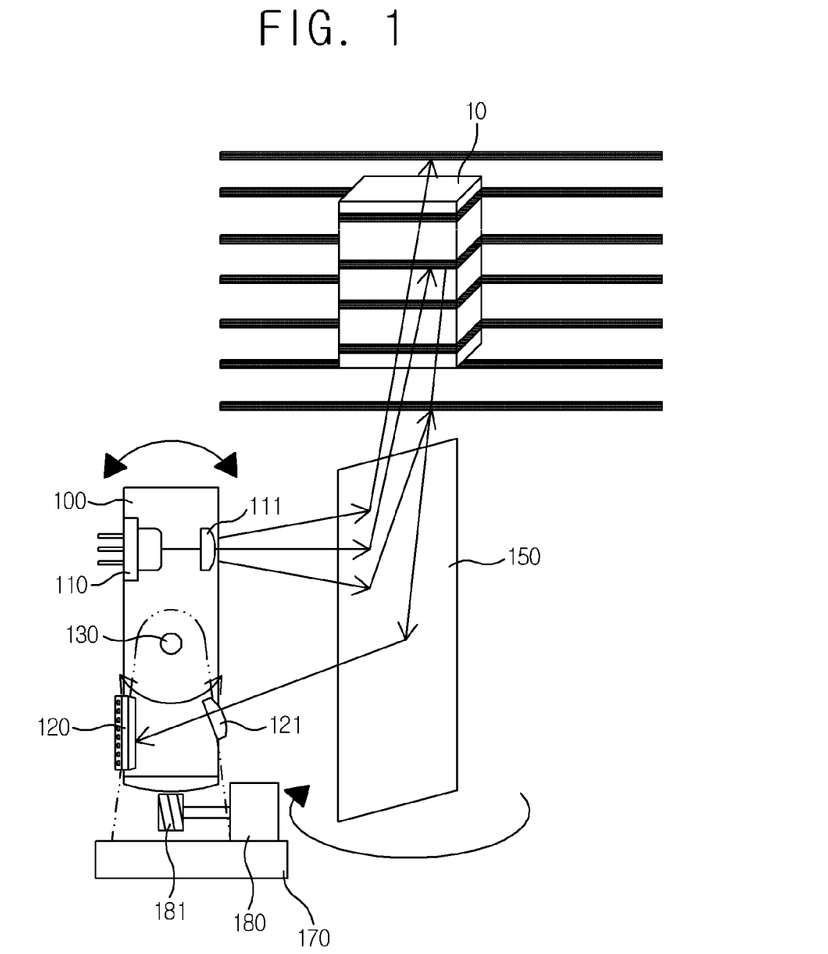
FIG. 1 is a mimetic diagram illustrating an apparatus for measuring a distance according to a first exemplary embodiment of the present invention.
Figure 2:
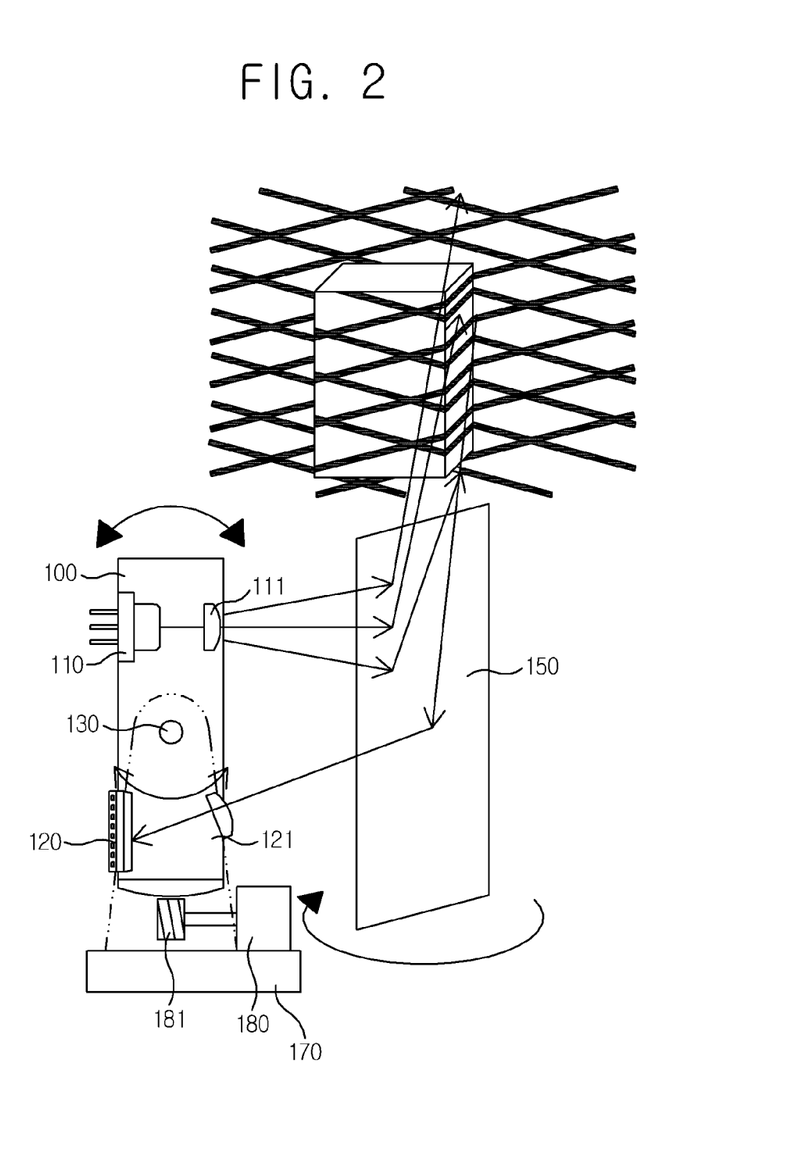
FIG. 2 is a mimetic diagram illustrating an exemplary operation by an apparatus for measuring a distance according to a first exemplary embodiment of the present invention.

FIG. 1 is a mimetic diagram illustrating an apparatus for measuring a distance according to a first exemplary embodiment of the present invention, and FIG. 2 is a mimetic diagram illustrating an exemplary operation by an apparatus for measuring a distance according to a first exemplary embodiment of the present invention.

The apparatus for measuring a distance (hereinafter referred to as apparatus) according to the present invention includes a tilting base (100) mounted with a light transmitter (110) configured to transmit a light and a light receiver (120) including a photo-detector formed with a spot of the light, and a rotating reflector (150) configured to reflect the light emitted from the light transmitter (110) to an object (10) and to reflect the light reflected or dispersed from the object (10) to the light receiver (120), where the base (100) mounted with the light transmitter (110) and the light receiver (120) is tilted to simultaneously tilt the light transmitter (110) and the light receiver (120).

The light emitted from the light transmitter (110) is reflected from the rotating reflector (150) to the object (10), where the light reflected or dispersed from the object (10) is reflected from the reflector (150) to the light receiver (120), whereby the apparatus can measure a distance to an object by scanning a 3-D space to detect the presence or absence of the object.

That is, as illustrated in FIG. 1, the rotation of the reflector (150) enables the light reflected from the reflector (150) to scan horizontal lines, and tilt of the base (100) allows the light emitted from the light transmitter (110) to be reflected from the reflector (150) and to scan a plurality of horizontal lines, whereby a 3-D scan of space for detection of an object can be possible.

To be more specific, one horizontal line is scanned by rotation of the reflector (150), and tilt of the base (100) and rotation of the reflector (150) enable scanning of other horizontal lines, and then, continued performance of rotation of the reflector (150) and the tilt of the base (100) enable the performance of 3-D scanning as illustrated in FIG. 1.

At this time, the apparatus may include a tilt driver configured to tilt the base (100), where the tilt driver may include a motor (180), a first gear (181) mounted on the rotation shaft of the motor (180) and a second gear (not shown) meshed with the first gear (181) and formed on the base (100). Reference numeral '170' in FIG. 1 is a support unit configured to support the motor (180).

Furthermore, the base (100) is tilted by an optical axis emitted from the light transmitter (110) and an axis (130) perpendicular to rotation shaft of the reflector.

The apparatus according to the first exemplary embodiment of the present invention can scan in a form of a grid as in FIG. 2, when the rotation operation of the reflector (150) and the tilt operation of the base (100) are simultaneously performed. The reflector (150) may be a mirror. Reference numeral '111' illustrated in FIGS. 1 and 2 is a collimate lens configured to make the light emitted from the light source to a parallel light and may be included in the light transmitter (110), and reference numeral '121' is a light receiving lens configured to concentrate a light dispersed or dispersed from the object (10), and may be included in the light receiver (120).

Figure 3:
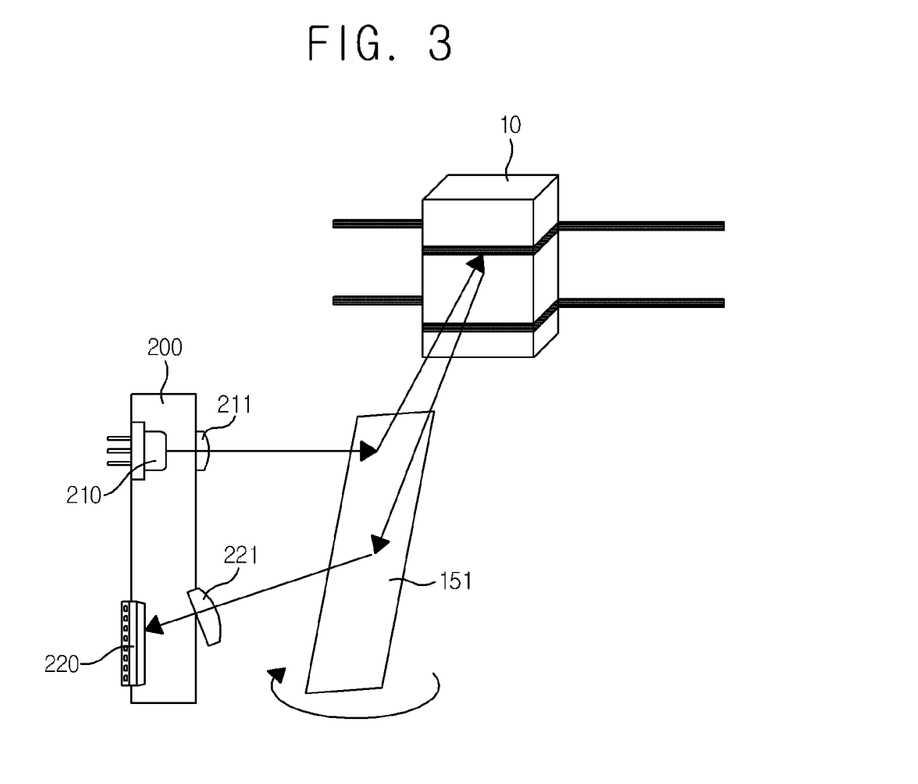
FIG. 3 is a mimetic diagram illustrating an apparatus for measuring a distance according to a second exemplary embodiment of the present invention.
Figure 4:
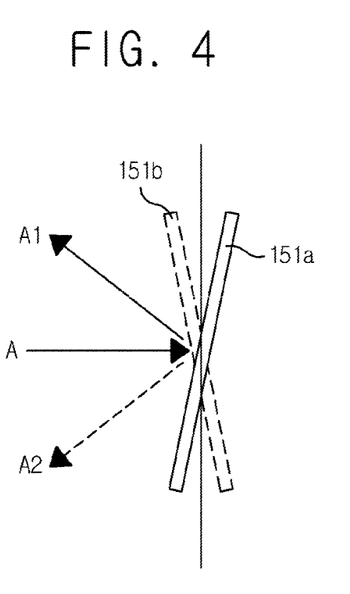
FIG. 4 is a mimetic diagram illustrating an operation of a reflector by an apparatus for measuring a distance according to a second exemplary embodiment of the present invention.
Figure 5:
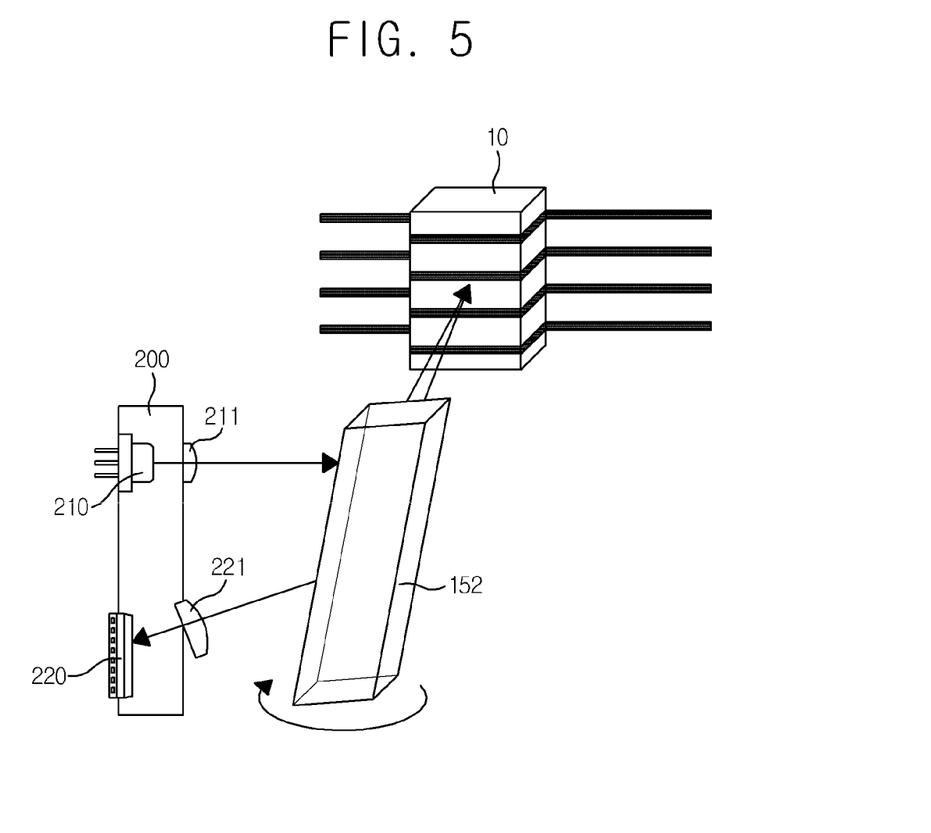
FIG. 5 is a mimetic diagram illustrating another operation by an apparatus for measuring a distance according to a second exemplary embodiment of the present invention.
Figure 6:
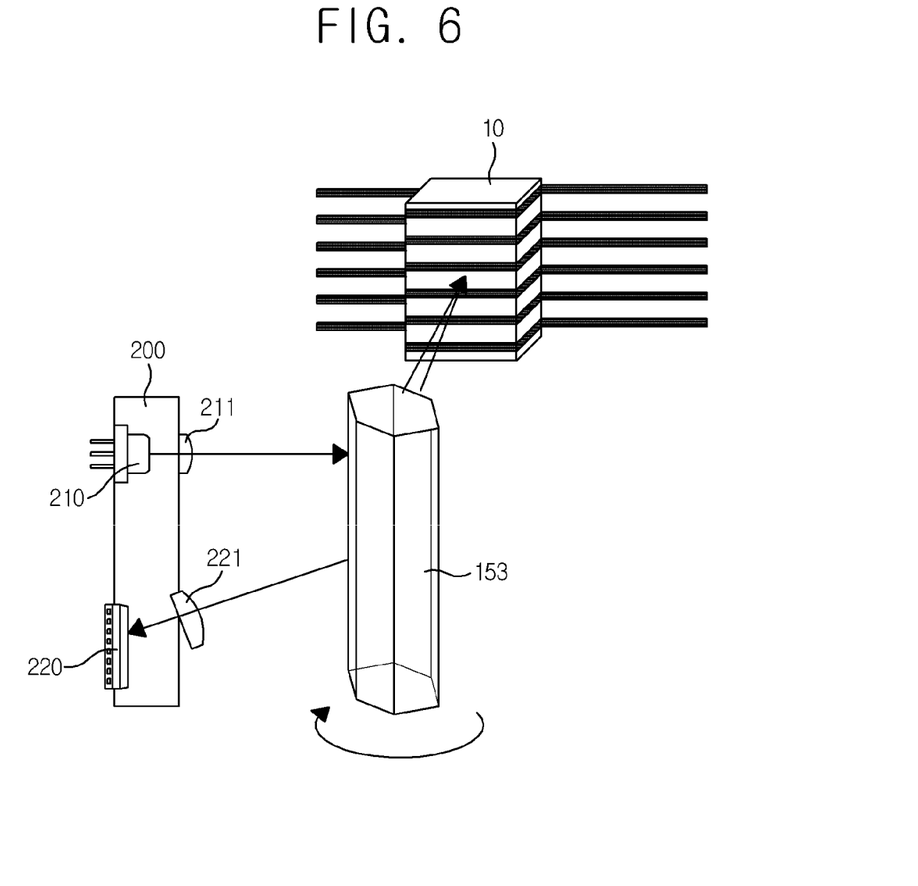
FIG. 6 is a mimetic diagram illustrating still another operation by an apparatus for measuring a distance according to a second exemplary embodiment of the present invention.

FIG. 3 is a mimetic diagram illustrating an apparatus for measuring a distance according to a second exemplary embodiment of the present invention, FIG. 4 is a mimetic diagram illustrating an operation of a reflector by an apparatus for measuring a distance according to a second exemplary embodiment of the present invention, FIG. 5 is a mimetic diagram illustrating another operation by an apparatus for measuring a distance according to a second exemplary embodiment of the present invention, and FIG. 6 is a mimetic diagram illustrating still another operation by an apparatus for measuring a distance according to a second exemplary embodiment of the present invention.

The apparatus for measuring a distance according to the second exemplary embodiment of the present invention may include a base (200) mounted with a light receiver (220) including a photo-detector formed with a spot of a light from a light transmitter (210) configured to emit a light, and a rotating reflector (151) configured to reflect the light emitted from the light transmitter (210) to a light reflecting surface, to reflect the light reflected or dispersed from an object to the light receiver (220), and to allow the light reflecting surface to be slanted to a rotation shaft.

That is, the apparatus for measuring a distance according to the second exemplary embodiment of the present invention is such that a light reflecting surface of the reflector (151) is slanted relative to a rotation shaft of the reflector (151) At this time, when the reflector (151) is a double-sided mirror formed with a light reflecting surface on a front side and a rear side of the mirror, and when the double-sided mirror is rotated, a light is reflected at a different angle from the front side and the rear side of the double-sided mirror, whereby an object can be vertically scanned in two lines as illustrated in FIG. 3.

For example, as illustrated in FIG. 4, a light (A) incident on the doubled-sided mirror is reflected to A1 direction when the double-sided mirror is in a front state (151a), and the light is reflected to A2 direction when the double-side mirror is rotated to be in a rear surface state (151b), whereby the light is reflected at a different angle from the front surface and the rear surface.

The base (200) in the second exemplary embodiment of the present invention may be in a fixed stationary state instead of being tilted. Furthermore, when the reflector (151) is a square pillar mirror (152) formed with a light reflecting surface on each of first, second, third and fourth surfaces as shown in FIG. 5, the light is reflected from four surfaces of the rotating square pillar mirror (152) to scan an object in four lines.

Furthermore, when the reflector (151) is a hexagonal pillar mirror (153) formed with a light reflecting surface on each of first, second, third, fourth, fifth and sixth surfaces as shown in FIG. 6, the light is reflected from six surfaces of the rotating hexagonal pillar mirror (153d) to scan an object in six lines.

Thus, the reflector (151) in the second exemplary embodiment of the present invention may be used with a double-side mirror, or poly-prism mirror.

For reference, reference numeral '211' in FIGS. 3, 5 and 6 is a collimate lens configured to make light to a parallel light, and may be included in the light transmitter (210), and reference numeral '221' is a light receiving lens configured to concentrate a light dispersed or reflected from the object (10) and may be included in the light receiver (220).

Figure 7:
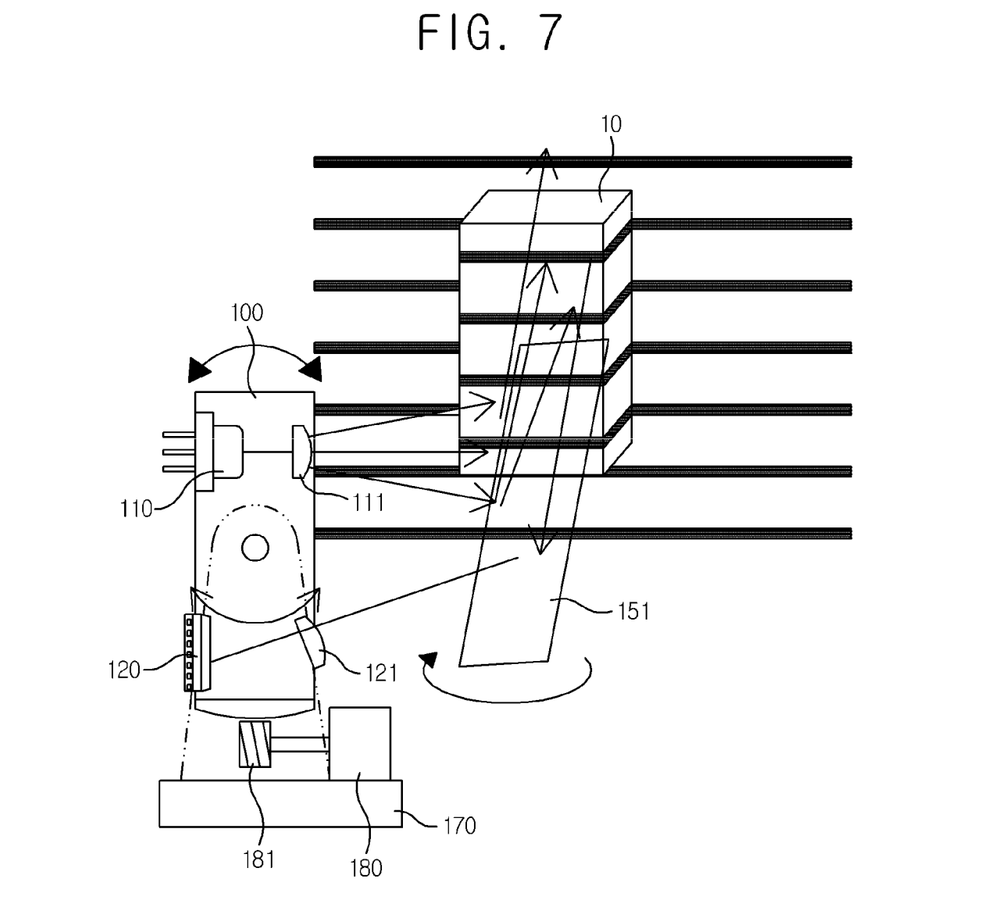
FIG. 7 is a mimetic diagram illustrating an apparatus for measuring a distance according to a third exemplary embodiment of the present invention.

FIG. 7 is a mimetic diagram illustrating an apparatus for measuring a distance according to a third exemplary embodiment of the present invention.

The apparatus according to a third exemplary embodiment of the present invention may include a tilting base (100) mounted with a light transmitter configured to transmit a light and a light receiver (120) including a photo-detector formed with a spot of the light, and a rotating reflector (151) configured to reflect the light emitted from the light transmitter to an object (10) using a light reflecting surface, and to reflect from the light reflecting surface the light reflected or dispersed from the object (10) to the light receiver (120) and to inclined to a rotation shaft at the light reflecting surface.

In the third exemplary embodiment, the light reflecting surface of the reflector (151) is inclined to the rotation shaft of the reflector (151), the base (100) is tilted and the reflector (151) is also rotated. In addition, the reflector (151) may be a doubled-side mirror or a poly-prism mirror.

That is, the third exemplary embodiment may be a combination of the first and second exemplary embodiments. Thus, as illustrated in FIG. 7, when the light reflecting surface of the reflector (151) is inclined to the rotation shaft and the reflector (151) is a double-sided mirror in the third exemplary embodiment, an object can be scanned in two lines because the light can be reflected at a different angle from the front and rear surfaces of the reflector (151), and may be additionally scanned by additional lines due to tilt of the base (100).

Figure 8:
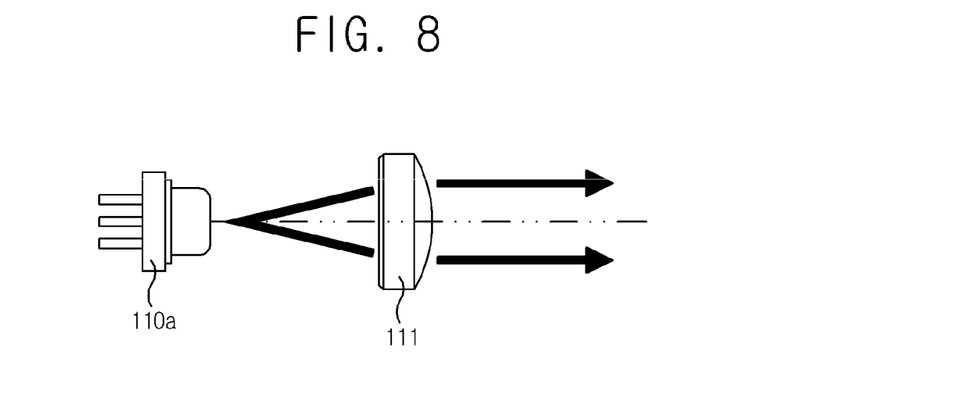
FIG. 8 is a mimetic diagram illustrating an example of a light transmitter on an apparatus for measuring a distance according to the present invention.
Figure 9:
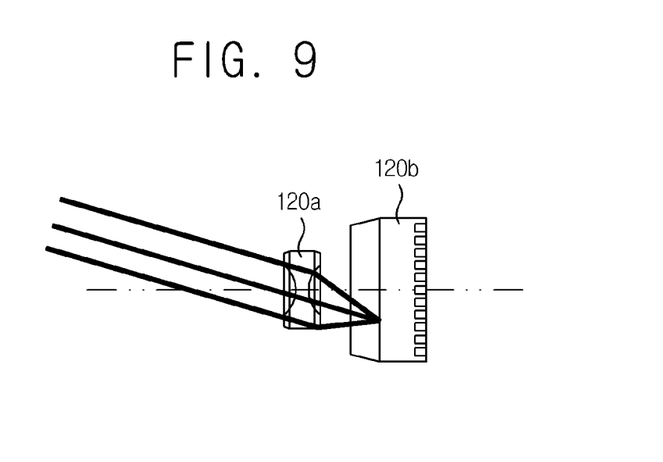
FIG. 9 is a mimetic diagram illustrating an example of a light receiver on an apparatus for measuring a distance according to the present invention.

FIG. 8 is a mimetic diagram illustrating an example of a light transmitter on an apparatus for measuring a distance according to the present invention, and FIG. 9 is a mimetic diagram illustrating an example of a light receiver on an apparatus for measuring a distance according to the present invention.

As discussed above, a light transmitter according to the exemplary embodiment of the present invention may include a light source (110a) and a collimate lens (111) configured to make the light emitted from the light source (110a) to a parallel light, where the light source (110a) may be an LD (Laser Diode) or an LED (Light Emitting Diode).

Referring to FIG. 9, the light receiver includes a light receiving lens (120a) configured to concentrate a light dispersed or reflected from the object, and a photo-detector (120b) configured to detect a position of the object using the light.

Furthermore the light receiving lens (120a) may concentrate the light reflected or dispersed from the object to a spot, and the photo-detector (120b) may be a photo-detector configured to allow forming a spot concentrated from the light receiving lens (120a). In addition, a wavelength selective transmission filter (not shown) may be interposed between the light receiving lens (120a) and the photo-detector (120b) for preventing an outside light other than the light emitted from the light source (110a) from entering the photo-detector (120b).

Figure 10:
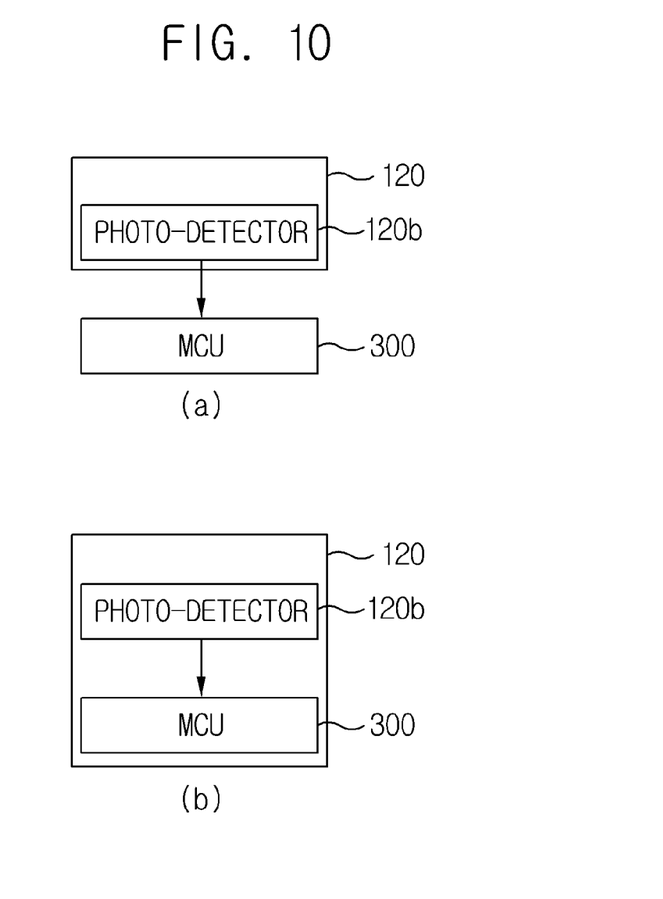
FIGS. 10a and 10b are schematic views illustrating an MCU (Micro Control Unit) connected to a light receiver of an apparatus for measuring a distance according to the present invention.

FIGS. 10a and 10b are schematic views illustrating an MCU (Micro Control Unit) connected to a light receiver of an apparatus for measuring a distance according to the present invention.

A signal relative to a distance to an object measured by the photo-detector (120b) of the apparatus may be processed by an MCU (300), whereby a signal is outputted to determine a distance data to the object or presence or absence of the object.

At this time, the MCU (300) may be mounted in a device separate from the light receiver (120) as in FIG. 12a, or may be embedded in a case of the light receiver (120) as shown in FIG. 12b. For reference, the MCU (300) may be deposited in a PCB (Printed Circuit Board).

Figure 11:
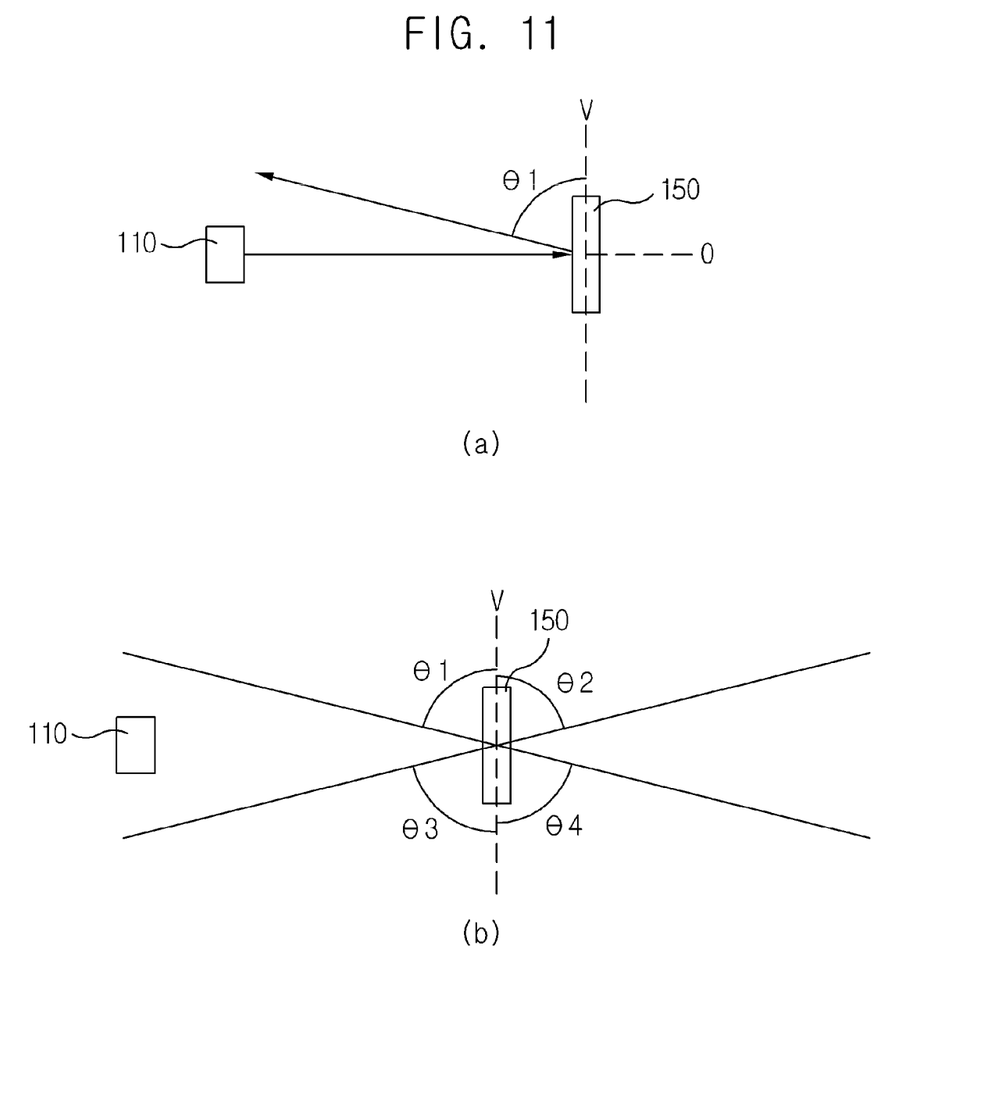
FIGS. 11a and 11b are mimetic views illustrating a scannable scope of an object in an apparatus for measuring a distance according to the present invention.

FIGS. 11a and 11b are mimetic views illustrating a scannable scope of an object in an apparatus for measuring a distance according to the present invention.

The apparatus according to the present invention can scan an object of up to ±85° based on an axis (V) perpendicular to an axis (0) of light emitted from the light transmitter (110). That is, as illustrated in FIG. 11a, the apparatus according to the present invention can scan an object of up to −85° ('Θ1') based on an axis (V) perpendicular to an axis (0) of light emitted from the light transmitter (110), and as illustrated in FIG. 11b, the apparatus according to the present invention can scan an object of up to ±85° (Θ1, Θ2) to one side of the light transmitter (110), and scan an object of up to ±85° (Θ3, Θ4) to the other side of the light transmitter (110).

Thus, the apparatus for measuring a distance according to the present invention can perform a more accurate scan by scanning an object to a scope of 170° from both sides of the light transmitter (110), by detecting the presence and absence of an object and by enlarging a scope of measuring a distance to the object.

Figure 12:
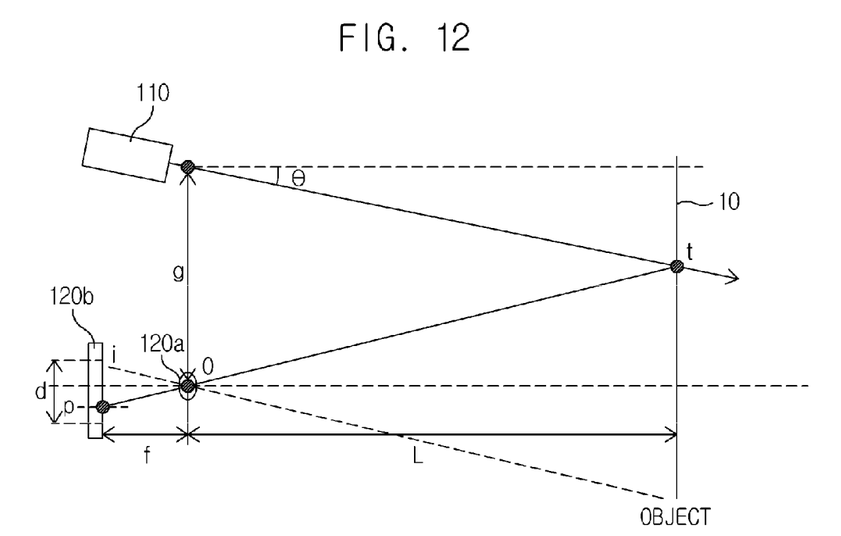
FIG. 12 is a schematic view illustrating a basic principle of a triangulation method in an apparatus for measuring a distance according to the present invention.

FIG. 12 is a schematic view illustrating a basic principle of a triangulation method in an apparatus for measuring a distance according to the present invention.

Referring to FIG. 12, the light transmitter (110) is slantly arranged relative to the object (10). The photo-detector (120) is spaced apart from the light transmitter (110) and the light receiving lens (120a) is interposed between the photo-detector (120b) and the object (10). At this time, a distance between the object (10) and the light receiving lens (120a) is defined as 'L' and then, the distance (L) may be calculated by the following Equation 1.

$$L = \frac{-fg}{p - f\tan\Theta}$$ [Equation 1]

where 'f' is a focal length, 'g' is a gap between a light source and a lens, Θ is an slant angle of the light source and 'p' is a position of spot of light reflected or dispersed from an object that is formed on a photo-detector.

As explained from the foregoing, the present invention is advantageous in that optical elements can be simplified by tilting a base mounted with a light transmitter and a light receiver and by slantly arranging a reflector, whereby a distance to an object can be measured by a single reflector.

Figure 13:
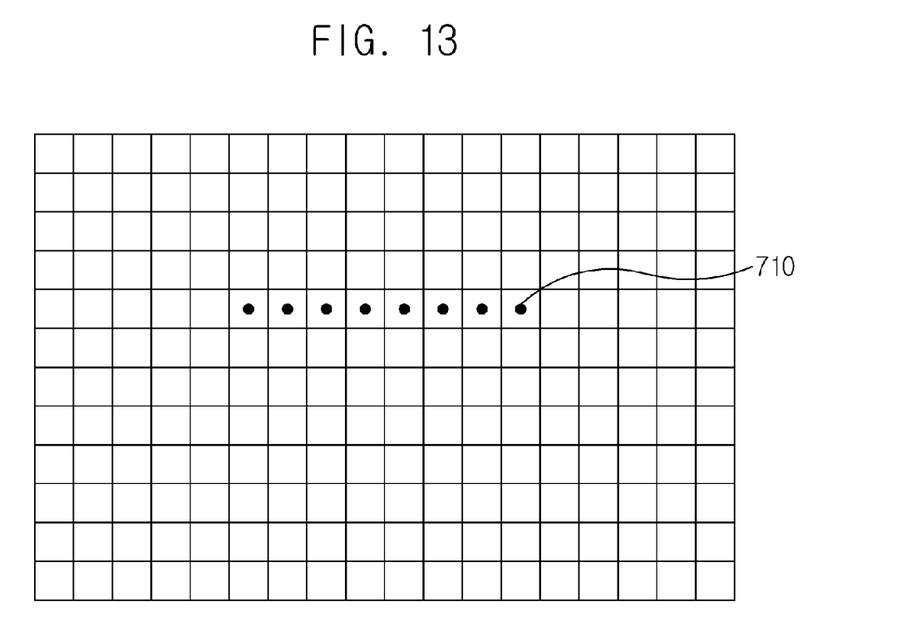
FIG. 13 is a mimetic plan view illustrating a spot formed on a photo-detector of a light receiver of an apparatus for measuring a distance according to the present invention.
Figure 14:
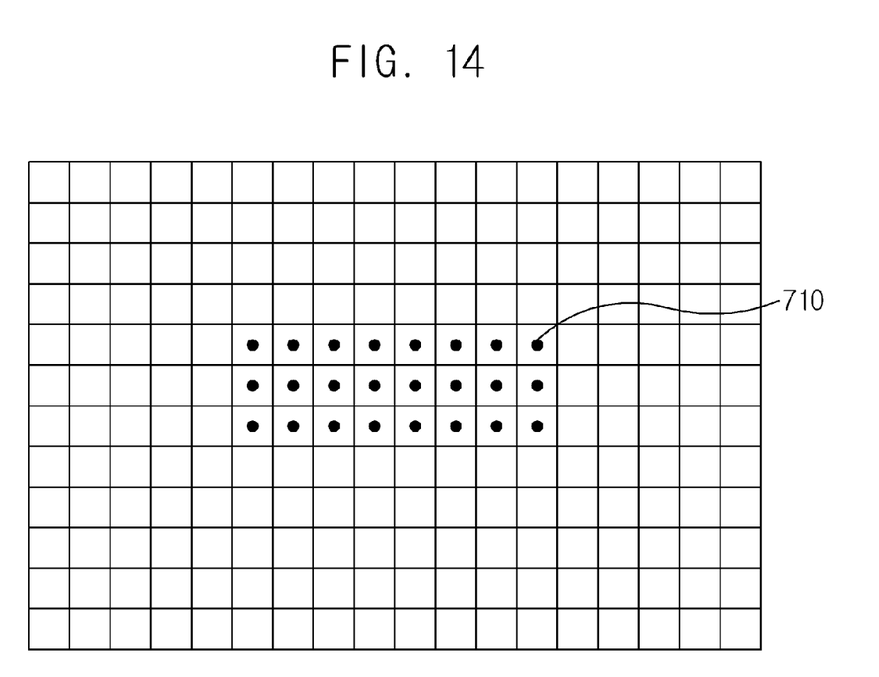
FIG. 14 is a mimetic plan view illustrating a spot formed on a photo-detector of a light receiver of an apparatus for measuring a distance according to the present invention.

FIG. 13 is a mimetic plan view illustrating a spot formed on a photo-detector of a light receiver of an apparatus for measuring a distance according to the present invention, and FIG. 14 is a mimetic plan view illustrating a spot formed on a photo-detector of a light receiver of an apparatus for measuring a distance according to the present invention.

The photo-detector according to the present invention may be an image sensor including a plurality of unit pixels arranged in 'n×m' matrix to convert an optical signal by the light to an electric signal, whereby optical spots (710) are formed on unit pixels of a plurality of lines of the image sensor, as illustrated in FIG. 13. Furthermore, the optical spots are formed on the unit pixels of a plurality of lines of the image sensor in response to tilting times (frequency) of the base as illustrated in FIG. 14.

At this time, although FIG. 13 has illustrated that spots are formed on parts of unit pixels of 5th line of the image sensor, the spots may be formed on an entire part of the unit pixels of 5th line of image sensor, and although FIG. 14 has illustrated that spots are formed on parts of unit pixels of 5th to 7th line of the image sensor, the spots may be formed on an entire part of the unit pixels of 5th to 7th line of image sensor.

The previous description of the present invention is provided to enable any person skilled in the art to make or use the invention. Various modifications to the invention will be readily apparent to those skilled in the art, and the generic principles defined herein may be applied to other variations without departing from the spirit or scope of the invention. Thus, the invention is not intended to limit the examples described herein, but is to be accorded the widest scope consistent with the principles and novel features disclosed herein.

INDUSTRIAL APPLICABILITY

The present invention has an industrial applicability in that optical elements can be simplified by tilting a base mounted with a light transmitter and a light receiver and by slantly arranging a reflector, whereby a distance to an object can be measured by a single reflector, and a 3D space is scanned using a triangulation method to detect presence and absence of an ambient object and to measure a distance to an object, whereby a scope capable of measuring a distance to an object and a scope capable of detecting the presence and absence of an object can be increased for a more accurate scanning of the object.

The invention claimed is:

1. An apparatus for measuring a distance, the apparatus comprising:
   a base mounted with a light transmitter emitting light and a light receiver receiving light; and
   a rotatable reflector reflecting light emitted from the light transmitter to an object and reflecting light reflected or dispersed from the object to the light receiver,
   wherein the base is tiltable from a first position to a second position different from the first position,
   wherein the light transmitter emits light in a first direction when the base is in the first position and the light transmitter emits light in a second direction different from the first direction when the base is in the first position,
   wherein the light receiver receives light in a third direction when the base is in the first position and the light receiver receives light in a fourth direction when the base is in the second position, and
   wherein a pathway of light reflected from the reflector is changed according to rotation of the reflector.

2. The apparatus of claim 1, further comprising a tilt driver configured to tilt the base, wherein the tilt driver includes a motor, a first gear mounted on a rotation shaft of the motor, and a second gear meshed with the first gear and formed on the base.

3. The apparatus of claim 1, wherein the base is tilted to an optical axis of the light emitted from the light transmitter and perpendicular to a rotation shaft of the reflector.

4. The apparatus of claim 1, wherein the reflector is a mirror.

5. The apparatus of claim 1, wherein:
   the reflector includes a light reflecting surface configured to reflect the light emitted from the light transmitter to the object and to reflect the light reflected or dispersed from the object to the light receiver; and the light reflecting surface is slanted according to a rotation shaft of the reflector.

6. The apparatus of claim 5, wherein the reflector is either a double-sided mirror formed with the light reflecting surface at each of two sides or a poly-prism mirror formed with the light reflecting surface at a poly surface thereof.

7. The apparatus of claim 1, wherein the light transmitter includes a light source and a collimate lens configured to convert the light emitted from the light source into parallel light.

8. The apparatus of claim 7, wherein the light source is an LD (Laser Diode) or an LED (Light Emitting Diode).

9. The apparatus of claim 1, wherein the light receiver includes a light receiving lens configured to concentrate the light dispersed or reflected from the object and a photo-detector configured to detect a position of the object using the light.

10. The apparatus of claim 9, wherein a wavelength selective transmission filter is interposed between the light receiving lens and the photo-detector for preventing an outside light other than the light emitted from the light source from entering the photo-detector.

11. The apparatus of claim 9, wherein the photo-detector is an image sensor including a plurality of unit pixels arranged in 'n×m' matrix to convert an optical signal corresponding to the light to an electric signal.

12. The apparatus of claim 11, wherein a spot is formed on unit pixels of a plurality of lines of the image sensor.

13. The apparatus of claim 9, further comprising an MCU (Micro Control Unit) configured to process a signal relative to an object distance measured by a photo-detector and to output a signal for determining whether there is object distance data or an object.

14. The apparatus of claim 13, wherein the MCU is embedded in a case of the light receiver.

15. The apparatus of claim 1, wherein the apparatus scans an object of up to ±85° based on an axis perpendicular to an axis of light emitted from the light transmitter.

16. The apparatus of claim 1, wherein the reflector is asymmetry has asymmetry based on a rotation shaft of the reflector.

* * * * *